United States Patent [19]
Van Toorn

[11] 3,813,515
[45] May 28, 1974

[54] APPARATUS WITH BUILT-IN THERMO-COUPLE FOR MEASURING AND CONTROLLING THE TEMPERATURE OF A BODY

[76] Inventor: Cornelis Hendrik Van Toorn, Bennebroekerdijk 213, Haarlemmermeer, Netherlands

[22] Filed: Nov. 9, 1971

[21] Appl. No.: 196,897

[30] Foreign Application Priority Data
Nov. 10, 1970 Netherlands .................. 7016462

[52] U.S. Cl.................. 219/471, 73/341, 219/510
[51] Int. Cl. ........................................ H05b 1/02
[58] Field of Search .................... 73/341, 355; 219/388, 469, 470, 471, 510

[56] References Cited
UNITED STATES PATENTS
2,074,455  3/1937  Carleton .................. 219/469 X
3,232,113  2/1966  Malone .................... 73/341 X
3,471,683  10/1969 Bogue ...................... 219/469

Primary Examiner—Bernard A. Gilheany
Assistant Examiner—Fred E. Bell

[57] ABSTRACT

Apparatus embodies a carrier and is adapted to measure and control the temperature of said carrier at least a portion of which is covered with a metallic coating thereon and provided with means for measuring the temperature of said coating with the aid of at least one thermo-couple, in which each thermo-couple lead of different materials is passed, electrically insulated through the carrier, each lead being interconnected at its end to spaced apart points on said coating, whereby that part of the gauging plane on the coating extending between the junction ends of the thermo-couple leads constitutes the hot junction of the thermo-couple which is in contact with the surface whose temperature may be monitored and/or controlled.

6 Claims, 9 Drawing Figures

APPARATUS WITH BUILT-IN THERMO-COUPLE FOR MEASURING AND CONTROLLING THE TEMPERATURE OF A BODY

The present invention relates to an apparatus adapted to measure and control the temperature of a carrier forming part of the apparatus. The carrier has at least one portion which is covered with a metallic coating applied thereon by electro-plating and is provided with means for measuring the temperature of said coating with the aid of at least one thermo-couple constituted of thermo-couple leads of different material electrically insulatingly passed through the carrier. The thermo-couple leads are connected by the electro-plated coating by virtue of the connection of the ends of the leads to spaced points on the coating, whereby that part of the gauging plane between the carrier and the coating extending from one junction to the other junction of the thermo-couple, constitutes the hot junction of the thermo-couple. Such apparatus is adapted by means of its thermo-couple(s) to measure the temperature at the outer surface of a body brought in temperature-contact with the active surface of the apparatus. In that case the apparatus functions as a measuring device for determining the temperature of the body. In another application, the temperature of the carrier, which is heated by means provided interiorly or exteriorly thereof, is transferred to the body. In some applications this imposed temperature is desirably maintained precisely constant under control of thermo-couples in a control circuit.

The apparatus is particularly suitable for measuring the temperature at the working surface, i.e. the working surface of a punch, die, roll or the like, since the ends of the thermo-couple leads are fed from below or from the interior through the carrier and therefore cannot be damaged during a working operation.

In order to provide a junction in the gauging or monitoring face of the carrier a hole is bored in two different places. The junction ends of both metal leads of the thermo-couple are inserted in the bored holes from the side facing the gauging plane and are secured in the gauging plane by an electro-plated metal coating. The metallic coating need not be restricted to the immediate surroundings of the junction ends. It can be extended to a strap bridging the whole distance between said junction ends which strap may project above the plane of the carrier when the apparatus is to be used as a measuring device. When a smooth surface is desired, the coating is provided in a groove which may preliminarily be milled out.

An apparatus is known in which the holes, in which the thermo-couple leads are disposed are close together so that the temperature of only small discrete zones can be measured. An important feature of the invention is that it permits determination of the average temperature prevailing over a substantial distance of the surface whose temperature is to be determined by means of a single thermo-couple, this being possible by arranging the thermo-couple leads at the respective end portions of a gauging plane.

The transitional junction is spread evenly into a long, thin strap having a thickness of a few micron between the two hot junctions proper, which in a normal thermo-couple would coincide, and behaves as an extremely susceptible "gradulator" for any influence which might come from the exterior to disturb the temperature balance by transferring this influence lengthward of the strap to both the hot junctions proper where this causes a change of the thermo-electric potential.

The adaptation of the basic thermo-couple concept herein disclosed to the apparatus according to the invention permits exact temperature measurements at the outer surface of the carrier to within 0.1° C. The apparatus can thus be used as a cooling or heating oven, -plate, -roll, or -calendar, with substantially continuous temperature control, or as a device for measuring the superficial temperature of bodies contacted by the apparatus of the invention. Such controlling device may be used for example in a toaster.

It is also possible to extend the temperature measurement to the entire gauging plane since, according to the invention, for a two-dimensional measurement of the temperature of a metallic surface, the junction end of two thermo-couple leads can be arranged at four points in the corners of the largest possible rectangle to be included in the gauging plane, with the proviso that the diagonally opposite thermo-couple leads be of the same thermo-couple metal and the thermo-couple leads facing each other along the sides of the rectangle be of different thermo-couple metal. Hence, by use of two thermo-couples arranged as described, a temperature measurement of the working plane can be obtained, this being impossible to attain with two conventional thermo-couples. Since the junctions of the four thermo-couples formed in pairs along the side of the rectangle, are situated in the gauging plane, it is also possible to determine the surface temperature of that part of the web of material in contact with the gauging plane, assuming the gauging plane serves wholly or partially as a heating surface for the web of material.

By utilizing a similar arrangement on the other side of the web of material the superficial temperature of the web can then be measured at both sides linearly and/or two-dimensionally. If the web material consists of metal or an alloy and thermo-couple leads of different metal are disposed on opposite sides of the web in opposed relationship, it is also possible to measure the temperature through the depth of the web and thus, if desired, to make in effect a three-dimensional measurement.

The free ends of the thermo-couple leads can be connected in a bridge circuit so that individual linear measurements along each of the sides of a rectangle (in the gauging plane or in a plane perpendicular thereto) can be made or, by making an effectively integrated measurement of the surface and its cross-section, a three dimensional measurement of the complete layer can be made.

At times it may be advantageous to have an apparatus which not only measures temperature but can also control temperature parameters to compensate for temperature deviations from a required temperature. For example, when processing material in a calendar roll, such as webs of paper or plastic material, the moisture contents of which may be non-uniform, greater cooling will occur in regions of greater moisture than elsewhere, when this material passes the gauging zone. This local cooling, which propagates rapidly in both directions along the gauging zone, is translated into and can be seen as a swinging displacement of a galvanometer operatively connected to the thermo-couple leads sensing the local cooling. The signal instead of being supplied to a galvanometer can be used in a control circuit for compensating for the heat loss occasioned by the local cooling.

It is a further feature of the invention to provide means for controlling the temperature of the gauging plane as a function of measurements obtained over the measuring trajectory, corresponding to the main dimension of a positively heated surface, by means of electrical heating elements disposed near the measuring plane.

To measure and control the temperature of, for example, a rectangular working plane with the apparatus of the present invention, four individual thermo-couple leads of two thermo-couples are placed at the four corners of the working plane. These individual thermo-couple leads also constitute mono-thermo-elements and provide two by two, both from an electrical and from a thermal point of view and due to the thin transitional junction, a hundred percent thermo-couple. Thus each thermo-couple lead might well be considered as a usual thermo-couple, this owing to the presence of the transitional junction. For example, in the event that thermo-couple leads $A_1$, $B_2$, $A_3$ and $B_4$ respectively (A standing for a metal like iron and B for an alloy like constantan) are arranged in the corners of a rectangle PQRS in order to provide thermo-couples in each of the four corners P, Q, R and S, viz. in the combinations Fe-Cu, Con-Cu, Fe-Cu and Con-Cu, an electrical connection between each pair of elements of the four iron-constantan couples formed on the working plane of the carrier is provided in the form of a thin coating of metal, for example, copper, applied by vaporization.

The advantages of the arrangement according to the invention are apparent when compared with a conventional arrangement having four isolated thermo-couples one in each corner. Such four thermo-couples work independently of one another only when applied from the exterior to the working plane. Obviously, as thus applied, they constitute an obstacle in the working space whereby to preclude a pressure operation and the passing of a web of material through the working space. Therefore, utilizing conventional arrangements, if the working space is to be free from such obstacles, the conventional thermo-couples must be brought close to the working plane from below through bores and to ensure contact with the working plane a thin metallic coating should be applied over the junction of the thermo-couple and at least the adjacent part of the working plane.

This conventional arrangement is applicable, however, only if the material of the carrier is of an electrically insulating material, such as plastic. The conventional arrangement, however, cannot be used with a metallic carrier because the four thermo-couples would all be short-circuited by the connection formed between the metallic coating and the metallic carrier so that the resulting thermo-electric power = 0. In any event, when using an insulated carrier and four conventional thermo-couples, information concerning temperature differences in the working plane along a measuring trajectory between two thermo-couples or an "average" integrated temperature cannot be obtained. The reason is that the connection between one couple and the other does not run over the measuring trajectory but effectively, in by-pass, so via the interior of the carrier. Such conventional connection does not therefore provide temperature differential information. Also information concerning temperature differences which may be present along a connection line cannot be obtained because only the local temperatures of the hot and cold junctions are sensed and determine the magnitude of the thermo-electric voltage. The junction in such connection line, where both leads of each pair of couples connected in series meet, should moreover be maintained at the temperature of the cold junction.

Accordingly it will be obvious that with such conventional arrangement, limited information only is available. To get information over an entire measuring surface, conventional techniques would require a large number of closely related conventional thermo-couples.

With the thermo-couple arrangment of the invention information can be obtained over a large surface by merely providing two pairs of thermo-couples, each pair having a lead at opposite ends of a side of, for example, a rectangle, the relationship being such that each lead is of a metal different from the thermo-couple lead in adjoining corners whereby to permit series connection in a bridge circuit of said thermo-couple leads. The extremely thin transitional junction between the electrodes of different material (and polarity) provides the necessary electrical connection, irrespective of whether the carrier is electrically conductive or of insulating material, and additionally provides the thermal connection which, though with prior arrangements was insensitive to temperature effects, is now because of its light thickness sensitive to temperature influence, and conducts this in opposed directions along a measuring trajectory towards both hot junctions where the temperature sensed is translated into a thermo-electric potential of adjacent individual thermo-electrodes.

The quick response to temperature deviations, giving "an average" via integration when utilizing the invention in the form of a measuring apparatus and which is obtained because the transitional junction is in the form of a coating interconnection of some micron thickness, provides a signal which may be used to control the temperature level at a predetermined value. For example, a temperature drop in a predetermined zone of a working surface will effectively cool both hot junctions. The cooling effect will be inversely proportional to the distance of this cool spot to each of the hot junctions. In other words, cooling will be more pronounced at that hot junction which is closest to said cold spot. Likewise the junction of the metal having the greater absolute thermo-electric potential will be influenced to a greater extent by the temperature drop than the junction of the metal of smaller thermo-electric potential. The relative thermo-electric potentials may therefore differ from a predetermined temperature differential and may accordingly be controlled to maintain a predetermined temperature. In other words, the difference between these two relative thermo-electric potentials yields a control signal which may be used to vary the temperature of an electric heating element adjacent to the gauging plane in order to compensate for the external effects sensed by the hot transitional junction.

The invention will be further explained with reference to the following description and the drawings annexed thereto FIG. 1 shows an arrangement of thermo-couples in a known apparatus constituted by a flat plate;

Figure 1:
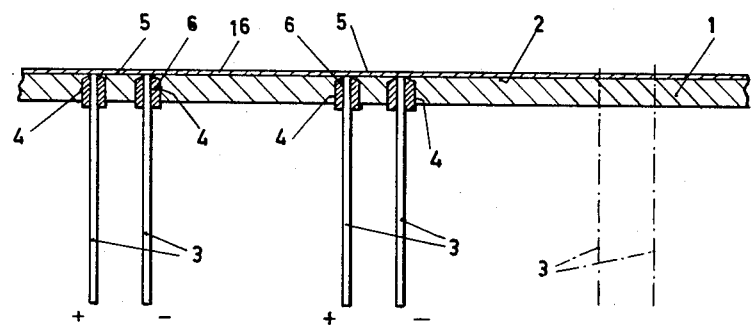

In FIG. 1 is shown a flat plate 1, for example, a steel die or punch, serving as a heating plate and made of copper or copper clad steel. The plate 1 may be heated electrically or in any other suitable manner.

In the illustrated arrangement the upper face 2 represents a surface at which the temperature is to be measured and is herein referred to as the "gauging plane." Since the space above the gauging plane 2 represents a work space, the thermo-couples 3, used for temperature determination, should be supplied to the gauging plane 2 from the lower side of the plate 1. To this end a number of openings 4 are bored in the plate 1 and the individual thermo-couple electrodes A and B are inserted in the openings with ample play. The ends of the thermo-couple electrodes (of metals or alloys A and B) are connected to the gauging plane 2 by a metallic coating applied by electro-plating. For example, a thin layer of chrome or nickel having a thickness of 0.1–0.2 mm may be appled by electroplating on the flat plate 1. The hot junction 5 of the thermo-couple 3 is thus formed in the region of the gauging plane extending between the junctions of each thermo-couple. The space between the wall of the opening 4 and thermo-couple electrodes A, B is filled with insulating material 6. Since in use of the apparatus, for example, as a heating device, the heating coils of the heating device extend close to and below the gauging plane 2, the temperature imposed can be controlled with precision within 0.1° C.

Because the thermo-electrodes A and B are arranged in close proximity in the FIG. 1 arrangement, the temperature at the surface of gauging plane 2 can only be determined within a small finite zone between the closely arranged thermo-couples 3. FIG. 1 illustrates a number of thermo-couples 3 which are randomly distributed in relation to the gauging plane 2. Integration of the various measurements by connecting the thermo-couples in FIG. 1 in series, is not possible since connecting the thermo-electrode A of one couple with the thermo-electrode B of another couple, will cause the couple so formed to be electrically short-circuited.

Figure 2:
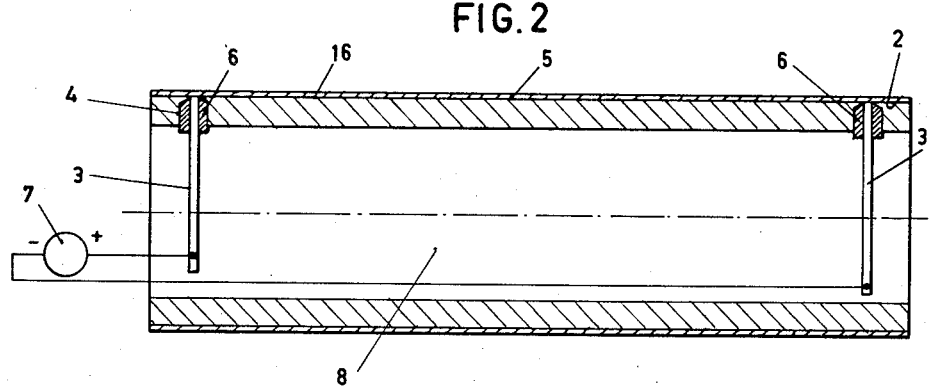
FIG. 2 illustrates a thermo-couple arrangement according to the invention used in an apparatus of cylindrical shape.

FIG. 2 illustrates the novel thermo-couple arrangement contemplated by the invention. As shown in FIG. 2, electrodes A and B of a thermo-couple 3 are distantly spaced apart so as to be adjacent opposite ends of a gauging plane whereby temperature differences prevailing between electrodes A and B may be integrated. The reading on a millivolt meter connected to electrodes A, B as shown in FIG. 2 is an indication of the average temperature prevailing over the gauging plane 2 between electrodes A and B. In FIG 2, instead of using a flat plate as a carrier, I have selected for illustrative purposes a hollow cylinder 8, such for instance, as a roll. In the illustrated embodiment the hot transitional junction of the thermo-couple extends the entire distance between the thermo-electrodes A and B.

Figure 3:
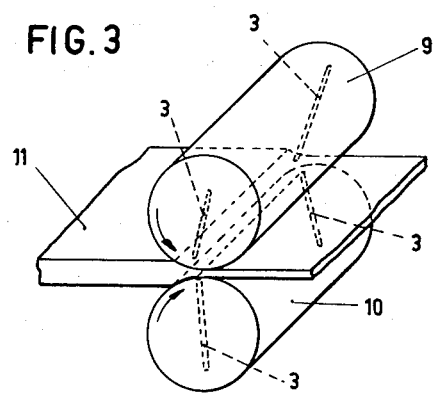
FIG. 3 represents an apparatus in which a thermo-couple is disposed on both sides of a web of material.

FIG. 3 schematically illustrates a pair of rolls 9, 10 fitted with thermo-couples which are positioned, for periodic determination of the temperature at the outer surface of the rolls, as in FIG. 2. A web of material 11 is passed between rolls 9 and 10. It will be appreciated that by arranging thermo-couple electrodes A, B on opposite sides of the web 11 an indication of the temperature at the upper and lower surfaces of the web will be provided since the contact area of the web with and -time between the rolls is sufficiently great to ensure the necessary sensitivity of the thermo-couple 3 to prevailing temperature conditions at the upper and lower surfaces of the web notwithstanding the large mass and heat capacity of the rolls. With the arrangement of the individual thermo-electrodes A, B in opposed relationship, as shown in FIG. 3, the average temperature in the cross section of the web can also periodically be determined during rolling of a metallic web.

Figure 4:
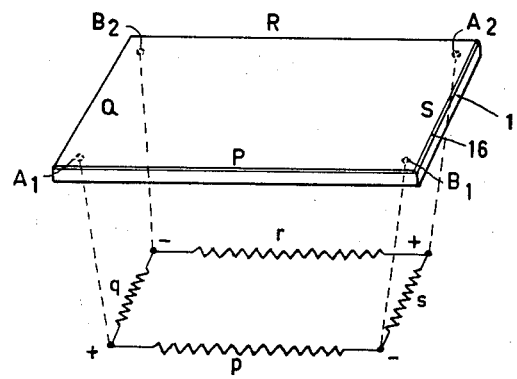
FIG. 4 shows an arrangement for obtaining a two-dimensional temperature measurement along a flat heating plate.

In addition to a cross-sectional measurement, apart from a linear measurement, a surface area measurement can also be obtained. Thus it is possible to determine with two thermocouples the average temperature at a measuring element or of a heating element if constituted by a flat plate. In FIG. 4 the flat plate is indicated at 1. Two thermo-couples $A_1$, $B_1$ and $A_2$, $B_2$ are positioned in the corners and are introduced from the underside; i.e. from below the plane of the drawing into suitable bores in the plate and secured by electroplating in the gauging plane to the metallic layer 16. In this way four hot junctions P, Q, R and S respectively are obtained as well as the equivalent of four conventional thermo-couples.

Figure 5:
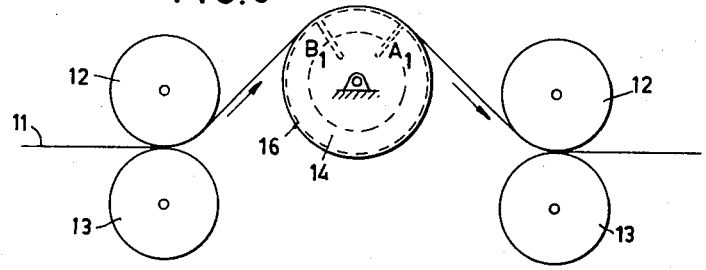
FIG. 5 illustrates the invention in conjunction with a heated stretch roll.
Figure 6:
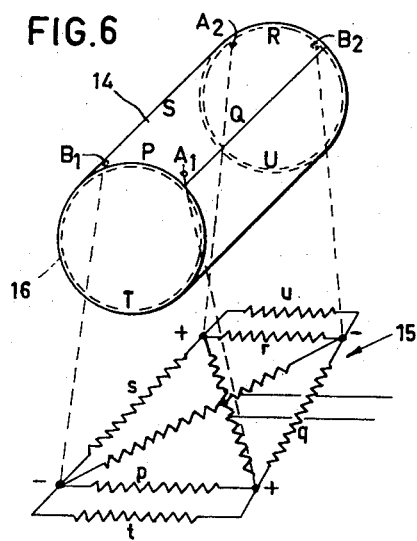
FIG. 6 represents the invention in its application to a cylindrical device for providing a two-dimensional temperature measurement, the thermo-electric devices being shown in an equivalent bridge circuit.

A surface area measurement may also be made if the carrier comprises a cylinder instead of a flat plate. In FIG. 5 an arrangement is shown, in which a web of material 11 is fed onto and from a stretch roll 14 via tension rollers 12 and supporting rollers 13. Near the front ends of the stretch roll 14 a thermo-couple A, B, is disposed so that a temperature measurement can be made along the axis of the web of material 11 and along the axis of the stretch roll. For temperature measurement along the axis of the roll it will be understood that second thermo-couple $A_2$, $B_2$ will be disposed at the rear end of stretch roll 14 as shown in FIG. 6. By integration it is possible to determine the temperature of the entire surface in contact with the stretch roll 14 by, for example, using a bridge circuit 15 as shown in FIG. 6.

By having the thermo-electrodes $A_1$, $B_1$, $A_2$ and $B_2$ arranged in the corners of the curvilinear rectangle coinciding with the curvilinear gauging plane, not only are four hot junctions P, Q, R and S obtained (as with the flat plate of FIG. 4) but also because the curvilinear trajectories P and R are part of a closed circle, hot junctions T and U are formed in parallel with the hot junction between $A_1$, $B_1$ and $A_2$, $B_2$ respectively. With the arrangement described there are a total of six hot junctions obtained with two thermocouples and accordingly the equivalent of six thermo-couples are obtained the outputs of which are connected in the bridge circuit 15 including resistors p to u inclusive. The thermo-electrode configuration shown in FIG. 6 can also be used in the arrangement illustrated in FIG. 3. In this manner linear, two-dimensional and three-dimensional temperature determinations may be made.

Figure 7:
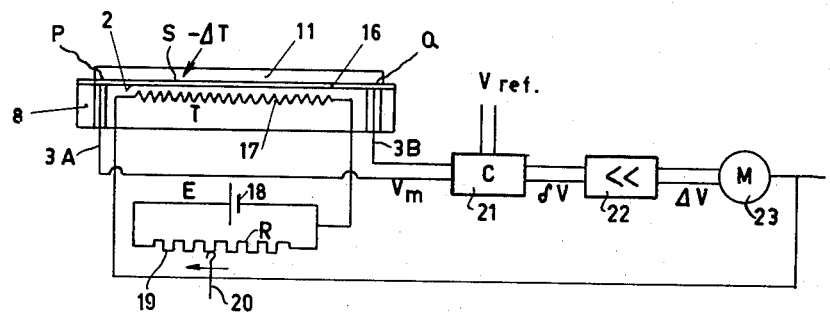
FIG. 7 represents schematically a control apparatus according to the invention.

In FIG. 7 the carrier whose temperature is to be measured and controlled, is a stationary roll 8 which cooperates with a rotating roll, not shown. Between these rolls a web of material 11 is fed. The temperature of the gauging or working plane 2 can be regulated with the aid of a heating element 17. The temperature at the working plane is transferred via the thin-electro-plated coating 16 of chrome or nickel, directly to the web material 11 to be processed. The metallic coating 16 constitutes the transitional junction between the two leads A and B of the thermocouple 3, viz. between the transitional junctions P and Q, formed by the connection of the ends of the thermo-couple leads 3A and 3B to the metallic coating 16.

The measuring trajectory extends between points P and Q located at or near the ends of the working line in the gauging plane and is determined by a single thermo-couple 3 which permits monitoring the temperature along the axial length of the carrier 8 and the width respectively of the web of material 11.

The heating element 17 situated near the working plane 2 is supplied with current from a voltage source 18 whose terminals are electrically connected across the heating element 17 through the intermediary of an adjustable resistor having a sliding contact 20 connected to provide as a function of its position a variable voltage across heating element 17.

As soon as a temperature drop $-\Delta T$ occurs at any arbitrary point, for instance S in the measuring trajectory PQ arising from a certain moisture concentration in the web of material 11, this is relected as a decrease of the thermo potential V.

In order to compensate for such deviation, the instantaneous voltage V of the thermo-couple 3 is supplied to a comparator 21 to which is also supplied a reference (desired) voltage, $V_{ref}$. The voltage difference $\delta V$ from the comparator is supplied after amplification in an amplifier 22 as $\Delta V$ to a motor 23. This motor is actuated and is linked by for example, a rack and pinion drive, not shown, to the slider 20 to move the slider 20 to the left so that a higher voltage is supplied to the heating element 17. In this way more heat is supplied to the working plane 2 for compensation of the external cooling effect.

The thin metallic coating 16 having a thickness of some microns permits rapid response to each temperature deviation from the desired temperature T and is accurate to within 0.1° C exact.

Figure 8:
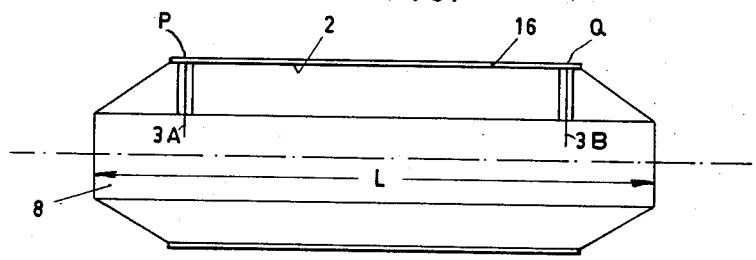
FIG. 8 shows a roll of predetermined shape for defining nomenclature herein used.

In FIG. 8 is shown a roll configuration used in the processing operations herein described. The only reason that this roll is presented is to clarify the meaning of the terms "measuring trajectory" and "main dimension" as used herein. The term "main dimension" includes the greates dimension of the measuring trajectory PQ over the active contact line or the working contact plane 2. The main-dimension of the body as roll 8, along the axis need not therefore coincide with the axial length.

Figure 6A:
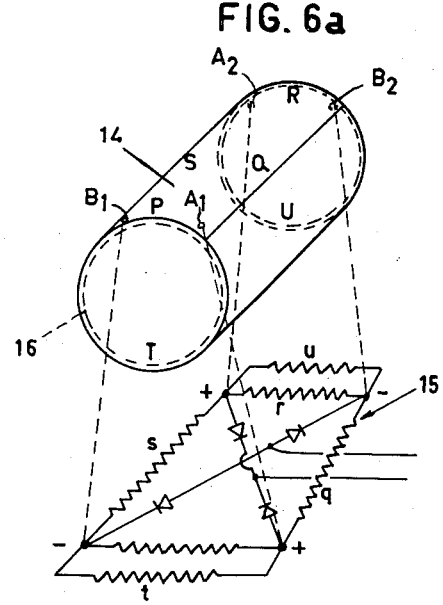

Still further modifications can be effected in the present device. For instance the diagonal resistors in FIG. 6 may be replaced by diodes 24, see FIG. 6A, which offers still further integration possibilities.

I claim:

1. In an apparatus for measuring and controlling temperature of a surface, a device comprising a carrier having at least one main dimension between relatively distant points on said carrier a thin continuous metallic coating of an electrically conductive metal on one side of said carrier along said main dimension between said distant points and having an exposed surface whose temperature is to be measured or controlled at least along said main dimension, and two thermo-couples each having an electrode of dissimilar metals electrically connected to a surface of the continuous coating opposite said exposed surface at said distant points, said electrically conductive metal, at said distant points of connection thereto of each of said electrode, constituting another electrode for each thermo-couple and comprising between said distant points a hot transitional junction for said thermo-couples.

2. In the apparatus of claim 1, wherein said coating on said carrier is of substantially rectangular form and whose longest dimension is at least said main dimension, said electrodes of dissimilar metals of said two thermo-couples being connected to said continuous coating adjacent the ends of the base of the rectangle and proximate thereto, two additional thermo-couples being provided each having an electrode of the same dissimilar metals as the first-named two thermo-couples, said electrodes of the additional thermo-couples being connected to said coating adjacent the ends of that side of the rectangular parallel to said base and proximate thereto, and diagonally opposing electrodes of said first-named and said additional thermo-couples being of the same metal.

3. In an apparatus according to claim 1, wherein is included means for controlling the temperature at said exposed surface of the coating, said means including an electrical heating element disposed adjacent to said exposed surface.

4. In an apparatus according to claim 1, wherein said carrier is provided with at least two openings at said distant points, said leads being insulatingly carried by the walls defining said openings for electrical engagement with the underside of said coating opposite said exposed surface.

5. In an apparatus according to claim 2 wherein a resistor is connected between each pair of electrodes of dissimilar metals and being combined into an integrated network.

6. In an apparatus for measuring and controlling the temperature of a surface, a device comprising a carrier having at least one main dimension between relatively distant points on said carrier, a thin continuous metallic coating of an electrically conducting metal on one side of said carrier along said main dimension between said distant points and having an exposed surface whose temperature is to be measured or controlled along at least said main dimension, and a single thermo-couple constituted of a pair of elements, each of a metal dissimilar to the other and the continuous metallic coating, said pair of elements being connected to a surface of the coating opposite said exposed surface at said distant points with said continuous thin metallic coating extending therebetween to form the hot junction for said single thermo-couple.

* * * * *